United States Patent Office 3,312,429
Patented Apr. 4, 1967

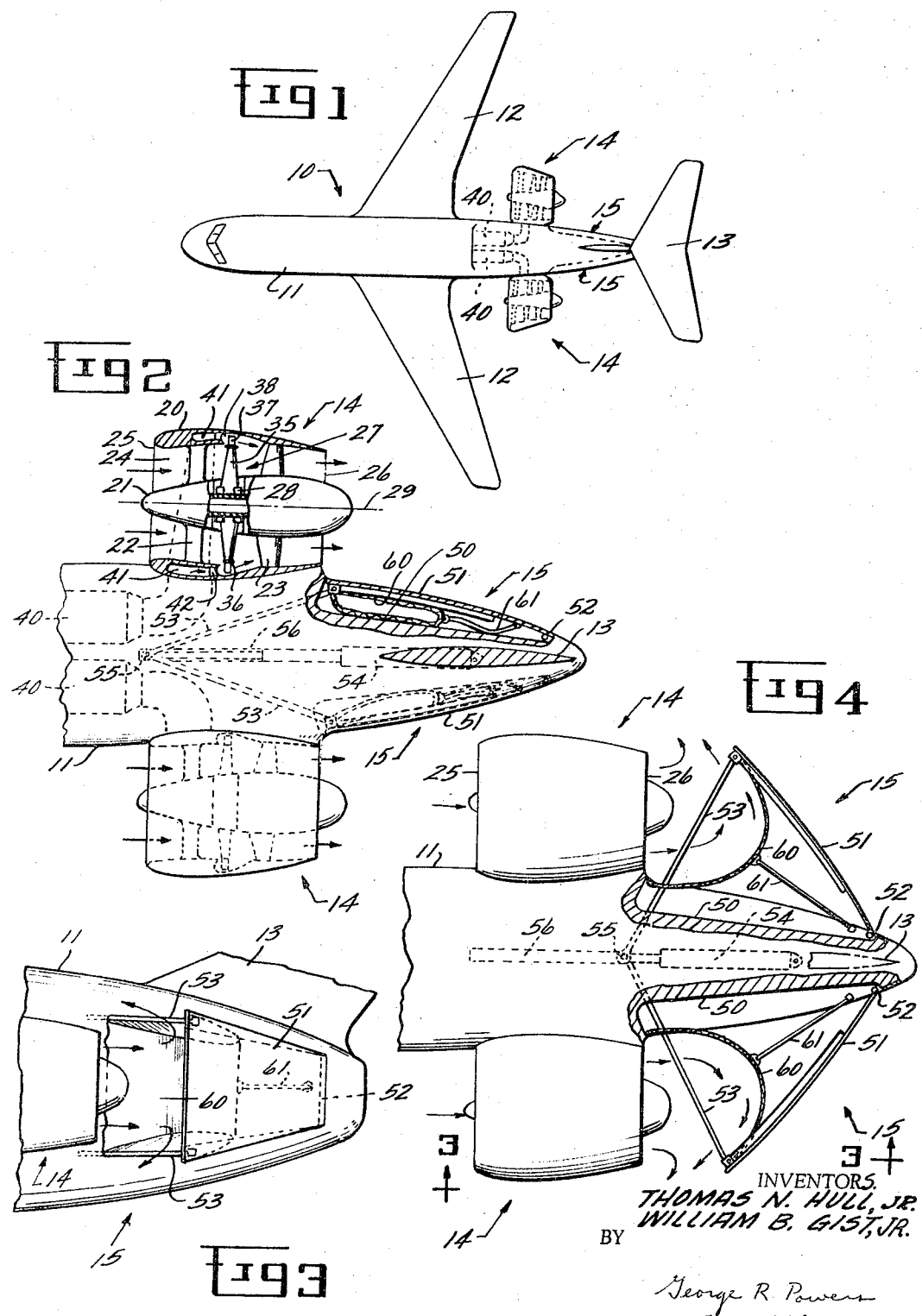

3,312,429
LIGHTWEIGHT THRUST REVERSER
Thomas Neil Hull, Jr., Marblehead, and William Bruce Gist, Jr., Lynnfield, Mass., assignors to General Electric Company, a corporation of New York
Filed May 19, 1965, Ser. No. 456,921
9 Claims. (Cl. 244—53)

This invention relates to thrust reversers and, more particularly, to lightweight thrust reversing means especially suited for use with jet propulsion units of the fan or high bypass ratio type.

In jet propelled aircraft, it is extremely desirable that effective and dependable means be provided for reversing the propulsion stream under certain conditions to thereby produce reverse thrust on the aircraft. During landing, thrust reversing may be used to bring the aircraft to a rapid halt without requiring the use of mechanical breaking systems. Similarly, a takeoff may be aborted at the last possible moment and the aircraft brought to a quick and safe stop through the use of thrust reversers. There are several obvious advantages in the use of thrust reversers. First of all, an effective thrust reverser acting in conjunction with the aircraft braking system can stop an aircraft in a much shorter distance than even the most effective mechanical braking arrangement acting alone; consequently, the aircraft may operate from much shorter runways. The use of thrust reversers thus extends the operational capability of both the aircraft and existing airfields as well as permitting the construction of new runways of minimum length at great savings in expense, time, and effort. Secondly, thrust reversers, which typically have essentially static components for reversing the jet stream, do not rely on the frictional dissipation of great quantities of energy for bringing the aircraft to a stop. As a result, the use of thrust reversers extends the operating life of certain aircraft components such as brake linings and tires.

With the modern trend in aircraft design toward larger and heavier aircraft, the need for effective thrust reversing is assuming ever increasing importance. This growing need is complicated, however, by another design trend relating to physical size of aircraft powerplants. More particularly, to provide the extremely high thrust required to propel large aircraft, various fan and high bypass ratio powerplants are being proposed and used. This type of powerplant, which extracts a portion of the energy present in the hot gas stream for accelerating a large volume of bypass air, is characterized by a relatively large jet stream diameter and relatively cool jet gases. The enlarging of state-of-the-art reversers for use on such powerplants may not be entirely satisfactory since the weight of such a thrust reverser will ordinarily increase at greater rate than its diameter as it is scaled up in size. Furthermore, in view of its weight, the loads exerted on its elements during operation, and other factors, it is desirable that a thrust reverser used with such large powerplants be relatively simple and straightforward in design and operation. Finally, a satisfactory thrust reverser should not add significantly to the total aircraft drag during aircraft operation; in particularly, the thrust reversing mechanism should not add to the already large diameter of a fan type propulsion unit.

It is, therefore, an object of this invention to provide improved lightweight thrust reversing means.

Another object of this invention is to provide improved thrust reversing means for use with jet propulsion powerplants of the fan type.

A further object is to provide for jet propulsion powerplants of the fan or high bypass ratio type thrust reversing means that is relatively simple and straightforward in both design and operation.

A still further object is to provide for use with large diameter jet propulsion powerplants thrust reversing means that does not increase the overall powerplant diameter.

Yet another object of this invention is to provide lightweight thrust reversing means that is relatively inexpensive to manufacture, install, and maintain.

Briefly stated, in carrying out the invention in one form, lightweight thrust reversing means is provided for deflecting a stream of motive fluid discharged by a jet propulsion powerplant of the fan type. The thrust reverser of this invention includes substantially rigid support means movably secured to the airframe upon which the powerplant is mounted and actuating means for moving the rigid support means between retracted and extended positions. A panel of flexible material is carried by the support means, the panel of flexible material extending across the normal path of an unobstruced fluid stream discharge by the powerplant when the support means is in the extended position. When a stream of motive fluid is being discharged with the support means in the extended position, the fluid stream impinging on the flexible panel will cause the panel to form a smooth curved wall for deflecting the stream from its normal rearward direction. The contour of the smoothly curved wall is such that the deflected direction of the stream of motive fluid has a substantial forward component to thereby produce reverse thrust on the aircraft.

By a further aspect of the invention, the support means is a substantially rigid panel pivotally secured to the airframe at its downstream end. The rigid panel in its retracted position covers a recess in the airframe within which the flexible panel is stowed, the rigid panel forming with the airframe a continuous uninterrupted aerodynamic surface. By a still further aspect of the invention, retraction means connects the flexible panel and the airframe for retracting the flexible panel to the recess as the rigid panel is moved from its extending to its retracted positions.

While the invention is distinctly claimed and particularly pointed out in the claims appended herto, the invention, both, as to organizaiton and content, will be better understood and appreciated, along with other objects and features thereof, from the following detailed description when taken in conjunction with the drawing, in which:

FIG. 1 is a plan view of an aircraft powered by fan type jet propulsion powerplants;

FIG. 2 is an enlarged view partially in cross section, illustrating in greater detail the cruise fans of FIG. 1 and illustrating in conjunction therewith the lightweight thrust reversing means of this invention, the thrust reversing means being shown in its retracted position;

FIG. 3 is a view taken along viewing line 3—3 of FIG. 4; and

FIG. 4 is a view similar to FIG. 2 showing the thrust reversing means in its extended, thrust reversing position.

Referring first to FIG. 1, an aircraft indicated generally by the numeral 10 is illustrated, the aircraft 10 having an airframe including a fuselage 11, a pair of wings 12, and a tail section 13. A pair of jet propulsion units 14 of the cruise fan type are symmetrically mounted on horizontally opposite sides of the aft portion of the fuselage 11 intermediate the wings 12 and the tail section 13. While the specific configuration and operation of the cruise fans 14 will be explained in detail at a later point in this specification, it will be well to point out at this time that powerplants of the fan type have relatively large diameters and are designed to produce propulsion streams of high mass and density at relatively low velocity. Cruise fans are thus capable of producing relatively high thrust and are, therefore, especially suited for propelling large and heavy aircraft at moderate aircraft speeds. In accordance with the present invention, lightweight thrust reversing means are provided for deflecting the jet streams discharged from the cruise fans 14. The lightweight thrust reversers of this invention, one being provided for each cruise fan 14, are indicated generally on FIG. 1 by the numeral 15.

Before proceeding to a detailed description of the novel and lightweight thrust reversing means 15 of this invention, attention is directed to FIG. 2 where one of the cruise fan powerplants 14 will be described in greater detail. Each cruise fan 14 includes an annular housing 20 and an elongated centerbody 21 concentrically supported within the annular housing 20 by a plurality of radial support struts 22 and 23, the centerbody 21 extending axially beyond both ends of the housing 20. The annular housing 20 and the centerbody 21 cooperate to define therebetween an axial passageway 24 including an inlet opening 25 and an exhaust nozzle 26 at opposite ends thereof. The rotor of a single stage fan 27 is rotatably mounted on the centerbody 21 by suitable bearings 28 for rotation about an axis 29. The single stage fan 27 has a compressor portion comprising a plurality of radial compressor blades 35 spanning the passageway 24. The outer tips of the compressor blades 35 are jointed by a circumferential shroud 36, and a plurality of radial turbine buckets 37 are mounted on the shroud 36 to form a turbine portion extending outwardly of the compressor portion. The turbine buckets 37 project into an annular recess 38 in the housing 20. Communication means is provided for supplying high temperature gas produced by a gas generator 40 to the turbine portion of the single stage fan 27, the communication means including a nozzle box 41 formed in the annular housing 20 and extending around at least a major portion of the periphery of the housing in alignment with the annular recess in the housing. More particularly, the nozzle box 41 includes vanes 42 which direct the combustion products produced by the gas generator to the turbine buckets 37 at the proper direction and at the proper velocity to drive the single stage fan 27. The fan arrangement just described is commonly referred to as being of the "tip turbine" type.

As described in the preceding paragraph, the combustion products directed to the turbine buckets 37 by the nozzle box vanes 42 drive the single stage fan 27. The stream of high temperature combustion products is decelerated as it flows through the turbine buckets 37, its extracted energy being used to accelerate ambient air drawn into the passageway 24 through inlet opening 25 and then passing through the compressor portion of the turbo-machine. The decelerated stream of combustion products leaving the turbine buckets 37 is discharged from the annular recess 38 into the axial passageway 24. The combustion products and the accelerated air mix in the passageway 24 to form a composite stream which is discharged through the exhaust nozzle 26 as a propulsion jet having high mass and relatively low velocity. Of even greater importance with respect to the present invention, however, is the fact that the composite motive fluid stream discharged from the exhaust nozzle 26 has a relatively low temperature. The reason for this relatively low temperature will be apparent by observing that a relatively large mass of cold bypass air is mixed with a relatively small mass of high temperature combustion products in the axial passageway 24. In practice, the stream of motive fluid discharged from a cruise fan of the tip turbine type will typically have a temperature in the range of 400° F. to 900° F. whereas the temperature of a typical jet stream comprised of combustion products alone will generally be greater than 1000° F. This temperature characteristic of cruise fans or, more generally, any high bypass ratio jet propulsion powerplant is quite significant with respect to the present invention since the relatively low temperature of the jet stream is particularly suited for novel and lightweight arrangement of this invention.

With reference now to FIGS. 2–4, the thrust reversing mechanism will be described. A recess 50 is provided in the fuselage 11 immediately downstream of each cruise fan 14. Each of the recesses 50 is covered by a substantially rigid panel 51 which is movably connected at its downstream end to the fuselage 11 by suitable means such as hinges 52. A pair of actuating rods 53 are connected to the upstream end of the rigid panel 51, each of the actuating rods 53 being pivotally connected at 55 to the corresponding rod of the other rigid panel. At this pivotal connection 55, the rods 53 may be moved axially within a track 56 by means of a hydraulic cylinder 54. By means of the hydraulic cylinders 54, the actuating rods 53, and the tracks 56, the rigid panels 51 may be moved between two operative positions, these being the closed or retracted positions of FIG. 2 and the open or extended positions of FIG. 4. In the retracted position of FIG. 2, illustrated by broken lines in FIG. 3, the rigid panel 51 forms with the fuselage 11 a continuous uninterrupted aerodynamic surface. In this position, the thrust reverser of this invention does not interfere in any way with the aerodynamics of the aircraft during normal flight operation. In other words, the thrust reversing means does not increase aircraft drag by increasing the diameter of the cruise fan 14.

Referring now to FIG. 4, the rigid panel 51 is illustrated in its extended position in which it extends outwardly from the fuselage 11 across the normal rearward path of a composite fluid stream discharged through the exhaust nozzle 26 of the cruise fan 14. This extended position is illustrated by solid lines in FIG. 3. A panel 60 of flexible material is secured to the upstream end of the rigid panel 51 and to the fuselage 11 in the vicinity of the upstream end of the recess 50. As determined by design considerations for any particular powerplant arrangement, the flexible panel 60 has a certain amount of slack when the rigid panel 51 is in its extended position, the slack being of an amount sufficient to permit the flexible panel 60 to form a smoothly curved wall or turning surface when a composite motive fluid stream is being discharged from the cruise fan 14 so as to impinge thereon. In this manner, the flexible panel 60 provides a smoothly curved thrust reversing surface for deflecting the stream from its normal rearwardly directed path to a new direction having substantial forward components for producing reverse thrust on the aircraft 10, the new direction being illustrated by the arrows of FIG. 4. Retraction means 61 is connected to the fuselage 11 and to the panel of flexible material 60 for automatically pulling the panel 60 into the recess when the rigid panel 51 is moved from its extended to its retracted position by the actuating rods 53 and the hydraulic cylinders 54. The retraction means 61 may take on any number of different forms; however, it will occur to those skilled in the art that some sort of an elastic arrangement is particularly suited for performing this function.

As pointed out above, a stream of composite motive fluid exhausted from the exhaust nozzle 26 of the cruise fan 14 has a relatively low temperature. Because of this, it is possible to use the simple and lightweight flexible panel 60 for deflecting the stream. In practice, the panel 60 may be fabricated from a broad range of flexible materials, including various fabrics. There are, however, several lightweight, strong, and durable materials which have particular utility for such use, these including fiberglass cloth, certain high temperature plastic materials, and woven metal cloth. Other suitable lightweight materials will, of course, also occur to those skilled in the art.

In the embodiment described above, the rigid panel 51 is moved between its extended and retracted positions by means of actuating rods 53 and hydraulic cylinders 54. It will occur to those skilled in the art that other actuating mechanisms may be devised to perform this function. For example, the rigid panel 51 may be moved between its two operative positions by means of a screw jack arrangement. Also, while a cruise fan 14 of the tip turbine type mounted on the fuselage has been illustrated and described by way of example, it will be obvious that the thrust reversing arrangement may be used with wing mounted powerplants and that other arrangements of turbomachinery could be used. For example, a fan assembly could be used for propelling the aircraft in which the compressor blades are mounted on the outer tips of the turbine buckets. Similarly, a geared or turbine driven fan arrangement in which no hot gases enter the main stream that is deflected by the novel thrust reversing means of this invention could be used to propel the aircraft. To use lightweight flexible panels for thrust reversing, it is preferable that the motive fluid stream used for propulsion be of relatively low temperature. It is, of course, understood that the term "low" is relative to normal temperatures associated with jet propulsion powerplants. In this respect, temperatures in the range of 400° F. to 900° F. are considered to be relatively low.

In view of the foregoing, it will occur to those skilled in the art that the novel thrust reverser of this invention may be used in conjunction with turbojet engines having low temperature exhaust gases as well as with turbofan engines.

From the foregoing, it will be appreciated that the lightweight thrust reversing means of this invention is particularly suited for use with jet propulsion powerplants having a low temperature motive fluid stream. Furthermore, the lightweight thrust reverser described above is relatively simple and straightforward in design and operation, and it does not increase either the overall powerplant diameter or aircraft drag during aircraft operation.

While particular embodiments of the invention have been shown and described, it will be understood that various changes and modifications may be made without departing from the spirit and scope of the invention and it is intended to cover all such changes and modifications by the appended claims.

What is claimed as new and desired to obtain by Letters Patent of the United States is:

1. An aircraft assembly comprising: an airframe including a fuselage and a tail section; a pair of propulsion units of the fan type mounted on said fuselage upstream of said tail section, said units symmetrically located on opposite sides of said fuselage in a common horizontal plane, and a pair of lightweight thrust reversing means each associated with a respective one of said propulsion units for deflecting a stream of relatively low temperature and low pressure motive fluid discharged by the propulsion unit, each of said lightweight thrust reversing means comprising:

a substantially rigid panel covering a recess formed in said fuselage adjacent the propulsion unit to form with said fuselage a continuous uninterrupted aerodynamic surface, means pivotally connecting the downstream end of said rigid panel to said fuselage, actuating means connected to said fuselage and to said rigid panel for pivoting said panel outwardly from said fuselage to an extended position extending across the normal path of an unobstructed fluid stream discharged from the propulsion unit, a flexible panel connected to said fuselage and to the upstream end of said rigid panel, said flexible panel forming a smoothly curved wall when said rigid panel is in said extended position and a stream of motive fluid is being discharged by the propulsion unit to impinge on said flexible panel, the smoothly curved wall deflecting the stream of motive fluid from the normal rearward direction to a deflected direction having a substantial forward compartment to thereby produce reverse thrust on the aircraft, and retraction means connected to said fuselage and to said flexible panel for retracting said flexible panel into said recess when said rigid panel is moved from said extended position to its position covering said recess.

2. An aircraft assembly as defined by claim 1 in which each of said propulsion units of the fan type comprises:

a gas generator, a turbomachine rotor having a row of radial compressor blades mounted thereon and a row of radial turbine buckets peripherally mounted on the radially outer tips of said row of compressor blades, bearing means supporting said rotor to permit rotation thereof, inlet means communicating with said row of compressor blades for supplying ambient air thereto, communication means connecting said gas generator to said row of turbine buckets for supplying gas produced by said gas generator to said turbine buckets for driving said turbomachine rotor, and exhaust means rearwardly directed with respect to said aircraft communicating with both of said rows of compressor blades and turbine buckets for exhausting fluid discharged from said rows as a propulsion jet.

3. In a jet propelled aircraft having a fan type powerplant mounted thereon for producing and discharging in a rearward direction a stream of motive fluid, thrust reversing means for selectively deflecting the stream of motive fluid from the normal rearward direction, said thrust reversing means comprising:

substantially rigid support means movable between a first retracted position and a second extended position, actuating means connected to said support means for moving said support means between said retracted and extended positions, and flexible material carried by said support means for forming a forwardly concave turning surface when said support means is in said extended position, said support means being connected to said flexible material to move said flexible material into position behind said powerplant, said flexible material having substantial slack therein when said support means are fully extended and the central region of said flexible material being displaced rearwardly relative to said connection of said flexible material to said support means, thereby causing said concave surface to be formed, the turning surface formed by said flexible material being positioned and contoured so as to deflect a stream of motive fluid discharged by the fan type powerplant from the normal rearward direction to a deflected direction having a substantial forward component to thereby produce a reverse thrust on the aircraft.

4. In a jet propelled aircraft having a gas turbine powerplant mounted thereon for producing and discharging in a rearward direction a stream of low temperature motive fluid, thrust reversing means for selectively deflecting the stream of motive fluid from the normal rearward direction, said thrust reversing means comprising:

airframe structure adjacent the gas turbine powerplant, substantially rigid support means movably secured to said airframe structure and movable between a first retracted position and a second extended position, actuating means connected to said airframe structure and to said support means for moving said support means between said retracted and extended positions, and flexible material carried by said support means for forming a turning surface when said support means is in said extended position, said support means being connected to said flexible material to move said flexible material into position behind said powerplant, said flexible material having substantial slack therein when said support means are fully extended and the central region of said flexible material being displaced rearwardly relative to said connections of said flexible material to said support means, thereby causing said concave turning surface to be formed, said flexible material being substantially enclosed within said airframe structure when said support means is in said retracted position, and the turning surface formed by said flexible material when said support means is in said extended position being positioned and contoured so as to deflect all of the stream of low temperature motive fluid discharged by the gas turbine powerplant from the normal rearward direction to a deflected direction having a substantial forward component to thereby produce reverse thrust on the aircraft.

5. In a jet propelled aircraft having a fan type powerplant mounted thereon for producing and discharging in a rearward direction a stream of motive fluid, thrust reversing means for selectively deflecting the stream of motive fluid from the normal rearward direction, said thrust reversing means comprising:

airframe structure having a recess therein adjacent the fan type powerplant, a substantially rigid panel movably secured to said airframe structure and movable between a first retracted position and a second extended position, actuating means connected to said airframe structure and to said rigid panel for moving said rigid panel between said retracted and extended positions, said rigid panel in said retracted position covering said recess to form with said airframe structure a continuous uninterrupted aerodynamic surface and in said extended position extending across the normal path of an unobstructed fluid stream discharged from the fan type turbomachine, and a flexible panel connected to said airframe structure and to said rigid panel for forming a forwardly curved turning surface when said rigid panel is in said extended position, said rigid panel being connected to said flexible material to move said flexible material into position behind said powerplant and additional retroaction means connected to a central region of said flexible material, the turning surface formed by said flexible panel being positioned and contoured so as to deflect a stream of motive fluid discharged by the fan type powerplant from the normal rearward direction to a deflected direction having a substantial forward component to thereby produce reverse thrust on the aircraft.

6. In a jet propelled aircraft having a fan type powerplant mounted thereon for producing and discharging through rearwardly directed exhaust means a stream of motive fluid, thrust reversing means adjacent said exhaust means for selectively deflecting the stream of motive fluid from the normal rearward direction with respect to the aircraft, said thrust reversing means comprising:

airframe structure having a recess therein adjacent the exhaust means of the fan type powerplant, a substantially rigid panel covering said recess to form with said airframe structure a continuous uninterrupted aerodynamic surface, said recess and said rigid panel having upstream and downstream ends with respect to the normal direction of travel of the aircraft, hinge means connecting the downstream end of said rigid panel to said airframe structure, actuating means connected to said airframe structure and to said rigid panel for pivoting said rigid panel about said hinge means to thereby move said rigid panel to an extended position extending across the normal path of an unobstructed fluid stream discharged from the fan type powerplant, and a flexible panel connected to said airframe structure adjacent the upstream end of said recess and to the upstream end of said rigid panel, said rigid panel being connected to said flexible material to move said flexible material into position behind said powerplant and additional retraction means connected to a central region of said flexible material, said flexible panel forming a smoothly curved forwardly concave wall when said rigid panel is in said extended position and a stream of motive fluid is being discharged by the fan type powerplant so as to impinge on said flexible panel, the smoothly curved wall deflecting substantially all the stream of motive fluid from the normal rearward direction to a deflected direction having a substantial forward component to thereby produce reverse thrust on the aircraft.

7. Thrust reversing means as defined by claim 6 in which said flexible panel is comprised of a fabric material.

8. Thrust reversing means as defined by claim 6 including retraction means connected to said airframe and said flexible panel for retracting said flexible panel into said recess when said rigid panel is moved from said extended position to its position covering said recess.

9. Lightweight thrust reversing apparatus for deflecting a stream of relatively low temperature and low pressure motive fluid discharged by a gas turbine powerplant for propelling an aircraft, said lightweight thrust reversing apparatus comprising:

support means movable between a first retracted position and a second extended position, actuating means connected to said support means for moving said support means between said retracted and extended positions, and flexible material carried by said support means so as to extend across the normal path of an unobstructed fluid stream discharged by the gas turbine powerplant when said support means is in said extended position, said support means being connected to said flexible material to move said flexible material into position behind said powerplant, said flexible material having substantial slack therein when said support means are fully extended and the central region of said flexible material being displaced rearwardly relative to said connection of said flexible material to said support means, thereby causing said concave turning surface to be formed, said flexible material forming a forwardly concave smoothly curved wall when both said support means is in said extended position and a fluid stream is being discharged by the gas turbine powerplant so as to impinge on said flexible material, the smoothly curved wall deflecting substantially all the stream of motive fluid from the normal rearward direction relative to the aircraft to a deflected direction having a substantial forward component to thereby produce reverse thrust on the aircraft.

(References on following page)

References Cited by the Examiner

UNITED STATES PATENTS

| | | | |
|---|---|---|---|
| 2,421,870 | 6/1947 | Dornier et al. | 244—113 |
| 2,758,805 | 8/1956 | Graham | 244—52 |
| 2,839,891 | 6/1958 | Drakeley | 239—265 |
| 2,933,272 | 4/1960 | Sinclair | 244—113 |
| 2,936,582 | 5/1960 | Davidson | 244—113 X |
| 2,950,878 | 8/1960 | Fowler | 244—113 |
| 3,013,751 | 12/1961 | Scott et al. | 244—110 |

References Cited by the Applicant

UNITED STATES PATENTS

| | | |
|---|---|---|
| 2,758,805 | 8/1956 | Graham. |
| 2,938,683 | 5/1960 | Morrison. |

MILTON BUCHLER, *Primary Examiner.*

B. BELKIN, *Assistant Examiner.*